Patented Sept. 28, 1943

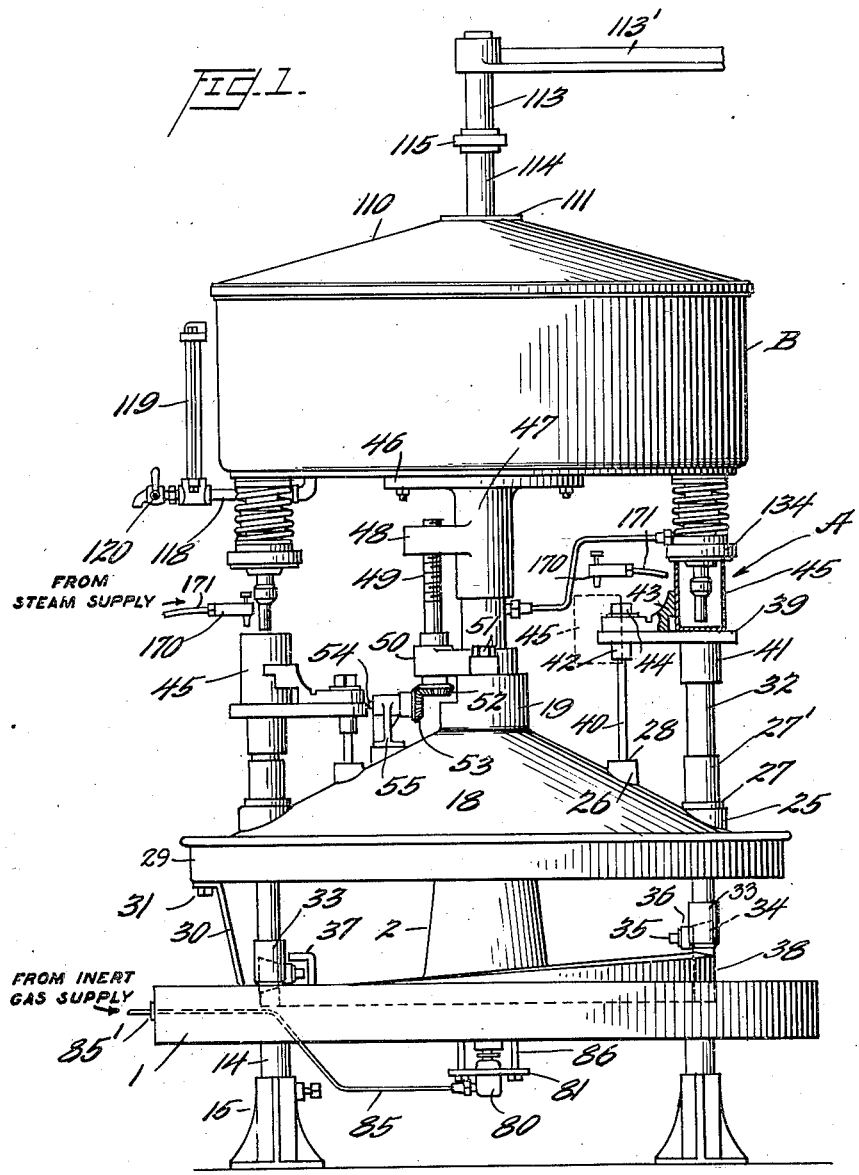

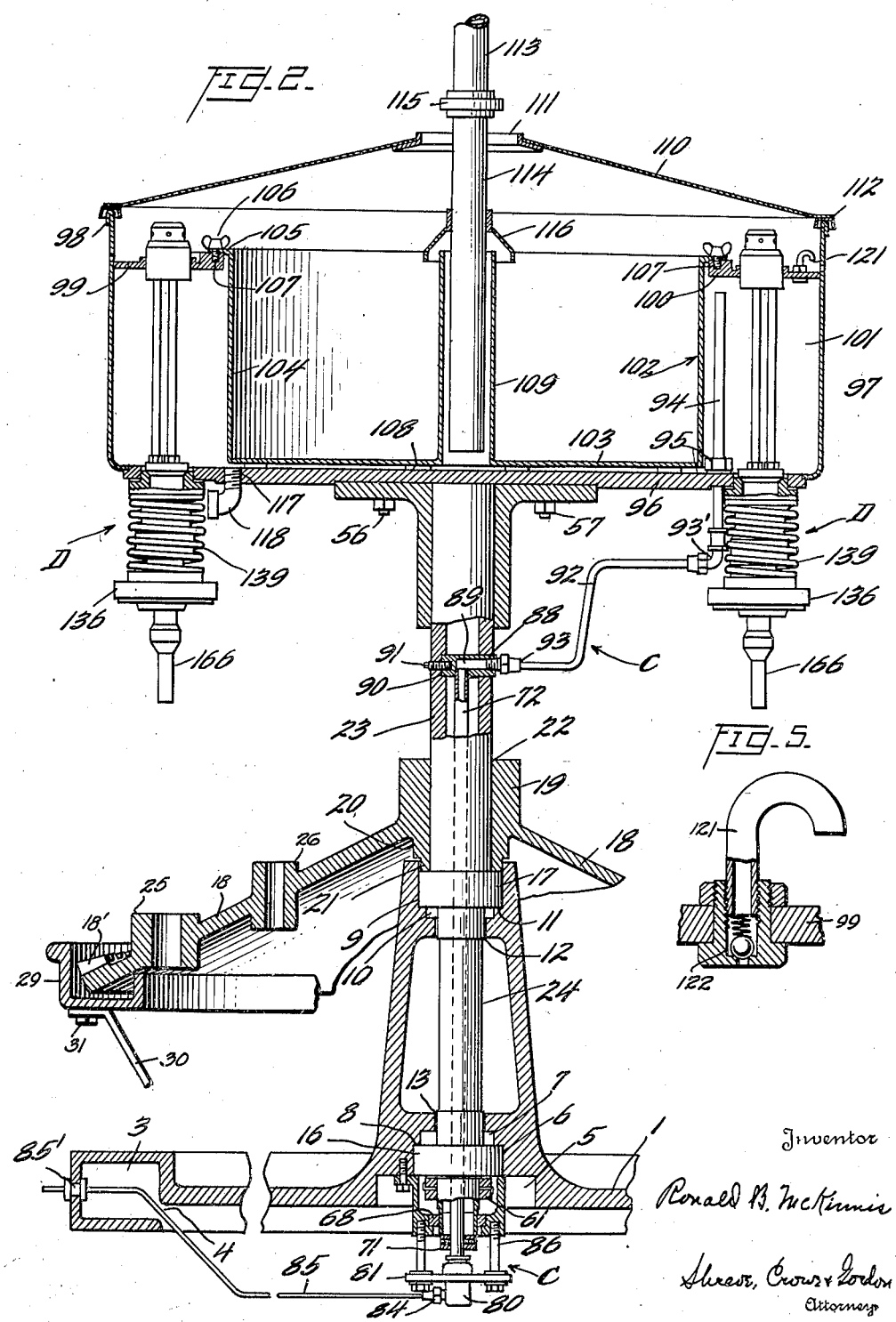

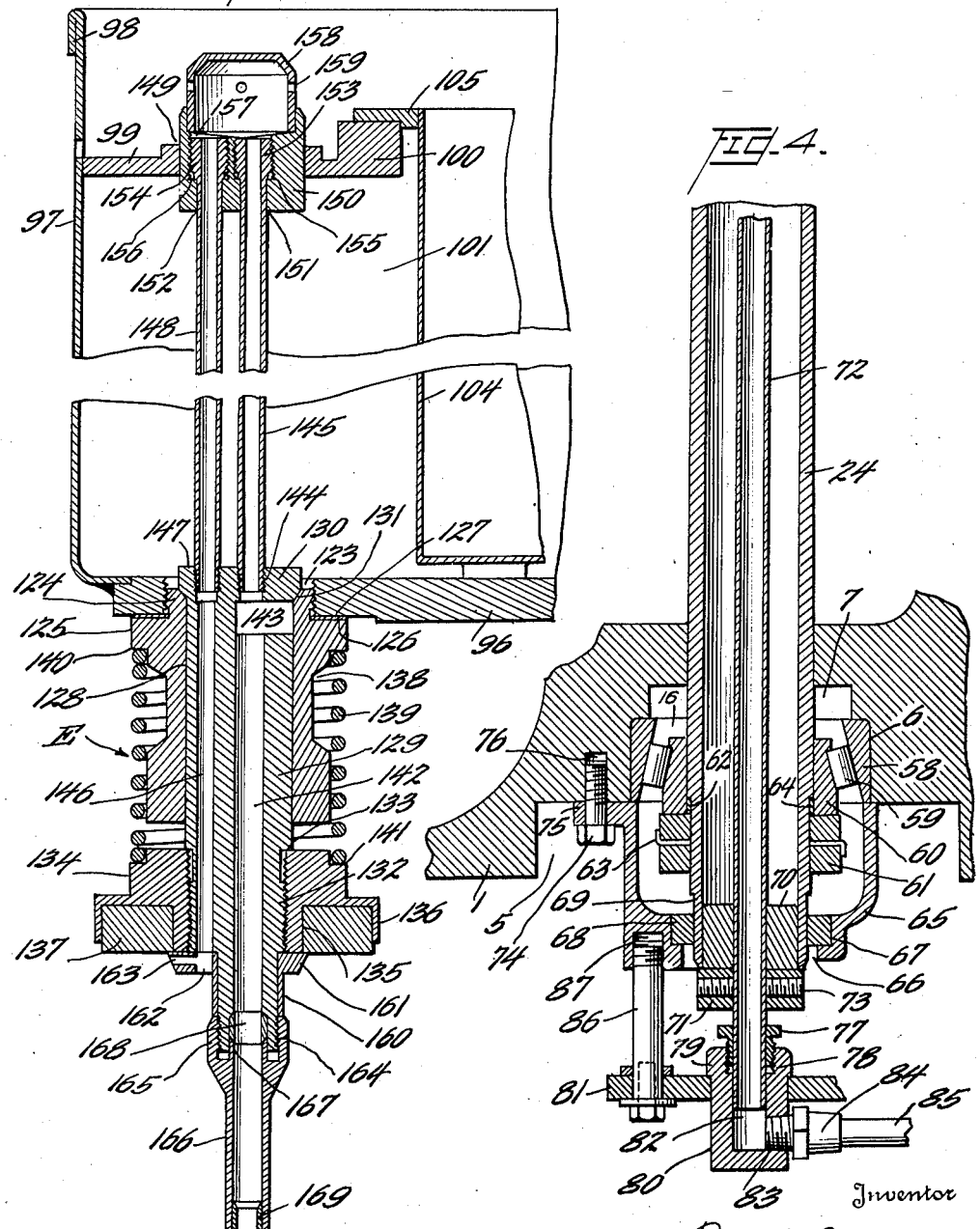

2,330,726

UNITED STATES PATENT OFFICE 2,330,726

APPARATUS FOR FILLING CONTAINERS

Ronald B. McKinnis, Winter Haven, Fla., assignor, by mesne assignments, to Ronald B. McKinnis, doing business as McKinnis Foods, Winter Haven, Fla.

Application September 20, 1939, Serial No. 295,809

8 Claims. (Cl. 226—68)

Generically this invention relates to filling machines, but it is more especially directed to such a machine and method of filling containers wherein the fruit juice or other liquid is maintained under air excluding conditions, and is adapted to be used in conjunction with that disclosed in my co-pending applications, Serial No. 224,388, filed August 11, 1938, which has matured into Patent No. 2,226,513 for Method and apparatus for extracting fruit and vegetable juices, and Serial No. 273,790, filed May 15, 1939, which has matured into Patent No. 2,274,243 for Apparatus for extracting fruit and vegetable juices.

One of the principal objects of this invention is the provision of means for confining the flow of the juice through the filler tank to a restricted area so as to provide a continuous flow of the liquid therethrough, the construction being such that the parts may be easily and quickly removed to permit cleaning and sterilization of the tank.

Another important object of this invention is the provision of a can or other container filling apparatus of the rotary type including a tank and means for delivering the fruit juice or liquid to and through the tank under oxygen free conditions and means for delivering a non-oxydizing inert gas to the tank to maintain the juice therein or passing therethrough and into the containers in such oxygen free condition.

A further important object of this invention is the provision of a filling apparatus of this character providing a detachable means for forming a restricted annular fluid space in said tank, air vent means in connection with said space, an annular series of valve mechanisms mounted in said space and slidably projecting through the top wall thereof and means in connection with said machine for purging each container as it slidingly contacts a filling valve during the filling operation.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a side elevation of the filling machine.

Fig. 2 is a vertical section through the tank showing the shaft and means for supplying gas to the tank.

Fig. 3 is a vertical section through one of the filling valves.

Fig. 4 is a vertical section through the lower end of the main shaft and supporting structure.

Fig. 5 is a detail view, partly in section, of one of the vents.

The machines of this general type heretofore in use with which I am familiar have proven deficient especially in connection with citrus juices and the like, the tank construction being such as to permit the accumulation of body particles and the adherence of such sediment to the walls of the tank so as not only to prevent a uniform distribution of the body particles but also to deleteriously affect the juice passing therethrough, such devices also being incapable of delivering the juice to the tank in an oxygen free condition and of maintaining the fluid or juice in such condition during its passage to and through the tank and into the containers, such devices not being capable of easy assembly and disassembly for cleaning and sterilization purposes; and therefore it was to overcome such deficiencies by providing a simplified and novel tank structure in the form of an annular restricted fluid channel, the channel forming means being easily removable, means for directing the fluid flow to said channel in such a manner as to substantially constitute a continuous stream through said tank during the operation of the device, thereby preventing the precipitation and accumulation of body particles and other matter, means for directing an inert non-oxydizing gas to the juice containing annular space in said tank, and filler valve constructions having their upper ends slidably mounted in the upper wall of said space, whereby said valves are easily removable for cleaning and the like, that I designed the filler method and apparatus forming the subject matter of this invention.

In the illustrated embodiment characterizing this invention there is shown a filler mechanism A, an improved tank construction B, and a shaft and gas conduit system C. Said filler comprises a base 1 having a centrally located pedestal portion 2, in the present instance, cast as an integral structure. Said base is formed with an annular space 3 having an annular opening 4, a central cut-out portion 6, and a further cut-out portion 7, forming a shoulder 8, and at its upper end with a cut-out portion 9, having a reduced countersunk portion 10, forming shoulder 11, and upper and lower aligned shaft openings 12 and 13, respectively. Said base 1 is supported on the relatively adjustable leg and foot portions 14 and 15. Suitably mounted in the cut-out portion 6 is a roller or ball bearing assembly 16 and mounted in opening 9 seating on shoulder 11 is the upper roller or thrust bearing 17. A rotary apron member 18 having a hub portion 19 formed with a depending reduced portion 20 terminating in a further reduced portion 21 conforming in dimensions to the cut out portion 9 is adapted to seat on roller bearing 17. Said hub 19 is formed with a bore 22 adapted to receive the upper enlarged portion 23 of the main hollow shaft 24 journaled in bearings 16 and 17, the lower end of said shaft extending below base 1, as will be apparent. Said apron 18 is formed with an annular series of push rod bearing lugs 25 and guide rod bearing lugs 26, respectively, said lugs formed with openings 27 and 28, respectively, and suitably mounted in said openings 27 are the push rod sleeves 27′, as and for a purpose hereinafter more fully appearing. The peripheral edge of apron 18 is surrounded by an annular trough 29 suitably supported on the trough supports 30, the upper ends of which are secured by cap screws 31 and the lower ends supported by and suitably secured to base 1, and said edge has an annular series of gear teeth 18′ for engagement with a suitable driving means not shown.

Mounted for reciprocating movement in sleeves 27′ are push rods 32 suitably mounted on the lower ends of which are the journaled rollers 34 on shafts 35 which extend through the housings 33 and on the free ends of which are mounted pull down rollers 36 adapted to engage under pull down segment 37 suitably secured to base 1 which is adapted to maintain rollers 34 in contact with the annular cam track 38 suitably mounted on base 1 which affects reciprocation of push rods 32 during the rotary movement of apron 18, as will directly more fully appear.

A container or can supporting platform 39 is adapted to be supported on a respective push rod 32 and adjacent guide rod 40 mounted for reciprocating movement in its opening 28. Suitably secured to the under surface of platform 39 is a sleeve member 41 adapted to receive the upper end of said push rod 32 to which it is suitably secured. At its other end platform 39 has a similarly secured guide rod sleeve 42 and mounted on the upper surface of said platform is a can guide 43. The upper end of guide rod 40 is adapted to extend through sleeve 42, platform 39 and guide 43 and to unitarily secure said parts by nut 44. Said guides 43 are correspondingly formed to the contour of cans 45 adapted to be slidably received thereby as the cans are delivered to the filler.

A tank support 46 has a depending sleeve 47 adapted to telescopically receive the upper end 23 of shaft 24 and said sleeve 47 is formed with a lateral lug 48 adapted to receive the threaded tank adjusting rod 49 journaled in the supporting collar 50 secured to hub 19 by cap screw 51. Mounted on the lower end of rod 49 is bevel gear 52 adapted to mesh with bevel gear 53 mounted on shaft 54 journaled in bracket 55 suitably secured to apron 18 and by means of which construction platform 46 secured to tank B by bolts or other suitable fastening elements 56 and nuts 57 is vertically adjusted by actuation of shaft 54 in accordance with the height of cans 45 or other containers to be filled.

The roller bearing 16 (Fig. 4) mounted in cutout portion 6, in the present instance, comprises outer raceway or bearing ring 58, rollers 59 and an inner ring or raceway 60 adapted to seat on collar 61 mounted on the slightly reduced portion 62 of shaft 24 secured by fastening means 63. Said collar 61 is formed with a vertical flange 64 extending within bearing ring 60. Underlying and in supporting relation with respect to bearing assembly 16 is an annular anchor housing 65 formed with an opening 66 and a countersunk opening 67 in which is adapted to seat packing ring 68 through which extends the further reduced end 69 of shaft 24. The lower end of shaft 24 is closed by block 70 held in place by collar 71 mounted on gas conduit 72 and secured by screws 73. Said gas line 72 extends through block 70 and upwardly through shaft 24. The annular anchor housing 65 is secured to base 1 by cap screws 74 extending through lateral lugs 75 and into threaded openings 76 formed in base 1, as will be apparent.

The lower end of gas line 72 extends below the collar 71 through gland nut 77 threadedly extending into stuffing box 78 formed in the head 79 of cap block 80 extending through anchor plate 81 and being supported by said head 79. Cap block 80 has a central bore 82 formed with a laterally inclined wall opening 83 communicating with its lower end, and adapted to receive the correspondingly formed end of pipe coupling nut 84 of gas supply line 85, extending through opening 4 and through base 1 as at 85′ and connected with a source of gas supply not shown. Said supporting or anchor plate 81 is secured to housing 65 by bolts 86 extending through said plate and threadedly engaged in openings 87 formed in housing 65. As will hereinafter more fully appear, such construction permits delivery of gas from supply line 85 to conduit 72 while at the same time permitting free rotation of said conduit and shaft 24. Spaced from the upper end of section 23 of shaft 24 (Fig. 2) is a coupling plug 88 partially bored as at 89 extending through the wall of shaft 24 with one end seating in countersunk portion 90 and with its other end flush with the outer surface of said shaft, said plug being secured by screw 91 threadedly extending through the wall of said shaft and into the solid end of said plug. The upper end of gas line 72 extends through the wall of said plug into communication with its bore 89. The gas line 92 is connected at one end to coupling nut 93, similar to coupling 84, and has its free end secured in the end of plug 88, said line extending outwardly from shaft 24 and connected by elbow structure 93′ to the perpendicular pipe section 94 which extends through stuffing box 95 or the like mounted in bottom 96 of tank B and thereby completing a continuous gas conduit from the source of supply not shown to tank B as clearly shown in Figs. 2 and 4.

Tank B adapted to contain the fruit or vegetable juice or other fluid to be delivered to the cans or other containers will now be described in further detail. Said tank B comprises an annular bottom 96 and to the circumferential edge of which is suitably connected metallic wall 97 having its upper edge crimped upon itself as at 98.

Side wall 97 spaced downwardly from its upper edge is formed with a lateral flange or channel top 99 having a thickened or annular seat portion 100. In order to form an annular channel 101 a center well member 102 having a bottom 103 and an integral wall 104 extending vertically from the peripheral edge of said bottom and formed at its free edge with a lateral flange 105 is inserted in said tank with flange 105 adapted to seat an annular seat portion 108 to which it is secured, to effect air-tight connection, by wing bolts 106 threadedly engaged in portion 100 as at 107. Said bottom 103 is formed with spacer lugs or feet 108 adapted to maintain said bottom in spaced relation with tank bottom 96 and also with an upwardly extending integral pipe section 109 of a height corresponding to wall 104. In order to prevent extraneous matter falling into said tank it is provided with a cover 110 formed with a center opening 111 and an inverted substantially U-shaped channel 112 adapted to engage over the upper crimped edge 98. Said top may be constructed with a removable section or sections to effect its quick removal or to permit ready access to the tank as desired. It will be noted that pipe 109 has communication in all directions with channel 101 formed by well 102 and the fruit juice or other fluid to be canned is introduced to said channel by juice supply pipe 113 having a removable end section 114 extending within said pipe 109 and connected to said supply pipe by coupling 115. The discharge end of said section 114 is spaced above the tank bottom 96 so as to permit free distribution of the fluid to said channel, and welded or otherwise suitably secured to said section is a hood member 116 overlying the upper end of pipe 109 to prevent the introduction of extraneous matter thereto. Said juice supply pipe 113 is supported by the suitably anchored retaining arm 113'.

Threadedly or otherwise mounted in bottom of tank B communicating with channel 101 as at 117 is a pipe 118 extending downwardly and outwardly on said tank and mounted adjacent its end is the sight glass 119 adapted to indicate the fruit juice or fluid level in the tank. Mounted on the end of pipe 118 is the two-way valve 120 adapted when moved to one position to permit the fluid to rise in tube 119 and in the other position to permit emptying of the tank of its fluid contents, whether juice or water, especially the latter, after the tank has been filled to exhaust the air therefrom, as will be hereinafter explained.

One or more air vent units 121, including opening and closing valve portion 122, are mounted in channel 99 in communication with channel 101, to permit escape of air during the air evacuating operation or the escape of gas under necessary operating conditions.

Carried by said tank B and mounted in channel 101 is the can filling valve assembly D comprising an annular series of valve and nozzle structures E, which will now be described.

Bottom 96 of tank B is formed with an annular series of openings 123 communicating with channel 101. Mounted in each of said openings and extending upwardly through said tank is a filler valve and nozzle structure E. Since all said structures E are identical, for brevity of description only one will be described in detail. Threadedly mounted in opening 123 is the reduced end 124 of valve casing 125 and on the shoulder 126 of which is seated a gasket to effect air-tight connection when said casing is threadedly tightened in position.

Valve casing 125 is formed with a central bore 128 in which is slidably mounted valve stem 129 having valve head 130 correspondingly formed to seat on the flared valve seat 131 of said casing. At a point spaced from its lower end when valve 130 is seated, said stem is formed with a threaded reduced end portion 132 forming shoulder 133. Threadedly mounted on said portion 132 is the filling head 134 having an enlarged lower end with a cut-out portion 135 therein and the annular flange portion 136 cooperating therewith to secure the rubber or resilient can contact sealing member 137 when the latter is suitably mounted in said cut-out portion. Said casing 125 has an annular hollowed out portion 138 adapted to insure complete compression of coil spring 139 mounted on said casing with one end engaging seat 140 and the other engaging seat 141 formed in the upper edge of filling head 134, whereby said filling head is normally biased in a downward direction and valve 130 maintained in closed or sealing position.

Valve stem 129 of said casing is formed with a juice or fluid discharge bore 142 communicating at its upper end with a juice or fluid receiving space 143, positioned immediately below valve 130 and into which the juice from channel 101 flows upon lifting of said valve 130. Said valve is formed with a threaded opening 144 communicating with space 143 and adapted to threadedly receive the lower end of an air vent tube 145.

Stem 129 is formed with an air vent bore 146 extending in parallelism with bore 142 and extending at its lower end through filling head 134 and at its upper end through valve 130 and threaded as at 147 to receive the threaded end of the detachable air vent tube 148 forming a continuation of air vent 146 and extending upwardly in parallelism with tube 145.

Channel top 99 is formed with an annular series of openings 149, in each of which is mounted for slidable movement a block head 150 effecting an air seal.

Said air vent tubes 145 and 148 extend through openings 151 and 152, respectively, formed in the lower portion of said block and terminating in threaded head portions 153 and 154 adaptable to threadedly engage corresponding threaded openings 155 and 156, respectively. The upper end of said block is formed with a cut-out portion 157 in which is removably mounted cap member 158 formed with an annular series of vent openings 159. Said cap 158 being removable for cleaning as desired. Suitably mounted on said stem 129 and secured to the under surface of filling head 134 by a rigidly secured sleeve 160 is a fluid displacement disc 161. Said disc 161 is formed with an air inlet opening 162 forming a continuation of bore 146 and with a communicating laterally extending air inlet 163 immediately adjacent the lower surface of said filling head for a purpose hereinafter more fully appearing. The lower end of stem 129 is threaded as at 164 for threaded engagement in the enlarged head 165 of detachable nozzle 166 and said head 165 is formed with an inner annular vertical flange 167 adapted to engage the inner surface of bore 142 and is correspondingly formed to engage the beveled structure 168 to form an air-tight connection when said nozzle section is threadedly tightened on said stem. Said nozzle constitutes an extension of valve 130 and includes different length sections 166 which may be interchangeably employed in accordance with the different sized containers to be filled or telescopically adjustable nozzle section 169 may be employed as desired.

From the above it will be apparent that when the open end of a can to be filled is brought into engagement with the resilient portion 137 of filling head 134 and force applied thereto valve 130 including the vent tubes 145 and 148 and block head 150 will be impelled upwardly and as valve 130 is unseated the contents of the tank or channel 101 will flow into space 143 and through bore 142 and nozzle 166 and be delivered to the can adjacent its bottom and, upon removal of said force, valve 130 under the action of spring 139 will be seated, cutting off the flow of the juice from the tank, as will hereinafter be further explained.

Positioned adjacent the rotary path of the can filling valve assembly D in a steam jet discharge structure 170 connected to a steam or other fluid pipe 171 communicating with a suitable source of supply (not shown), and suitably positioned and supported so as to discharge a jet of steam into each empty can 45 at the instant immediately before it sealingly contacts the resilient seal 137 to purge said can. A similar steam air mechanism is similarly positioned with respect to assembly D so as to discharge a jet of steam to the filled can as it leaves the filler mechanism A and is delivered to the can capping or sealing apparatus to form a protective layer in the top of the can during its delivery.

While the general operation of the device would seem to be clear from the above description, yet in order to thoroughly understand its method and operation with respect to sterilization, air evacuation, and the introduction and maintenance of an inert gas in its place and during the can filling operation so as to maintain the juices under oxygen free conditions, the operation will now be described in further detail.

It will be understood that the juice supply pipe line 113 and the gas line 85 are connected to suitable sources of supply, and are controlled by conventional valve control means, which in the interest of brevity of description it has not been deemed necessary to show.

Initially a sterilizing fluid such as hot water is introduced to tank B through juice pipe 113 and vents 121 are open. When channel 101 is filled so that water flows from said vents, all air is displaced. The vents are then closed, the flow of water to pipe 113 cut off, and valve 120 opened to permit water to flow from said tank as gas under pressure is admitted through pipe 94 adjacent the top of channel 101 and occupies the space as the water is displaced, and when gas discharges from valve 120, said valve is closed thereby connecting the interior of the tank with sight glass 119. Then the juice is admitted to pipe 113 and delivered beneath well 102 to channel 101, and as the tank or channel is filled the gas in excess of the predetermined pressure may be discharged from said vents 121. At this point the can filling operation may begin. Motion is imparted to shaft 24 through apron 18 or in any suitable manner and this effects rotation of the tank with its can filling valve assembly D. By other means (not shown) the cans are delivered successively each to a platform 39 when its push rod 32 is at approximately its lowest point with respect to cam track 38, as shown in Fig. 1, and as said push rod advances on track 38 the can is impelled upwardly until the upper edge sealingly engages the resilient seal 137 of filler head 134, and at the instant before the can effects its sealing contact a jet of steam from nozzle 170 is injected into said can, displacing its air content, and during the further travel of push rod 32 upwardly on the cam track 38 valve stem 129 and valve block 150 are moved permitting the fluid contents of channel 101 to flow into space 143 and through bore 142 and nozzle 166 and discharge at the bottom of can 45. As the can 45 is filled any air remaining in said can is forced upwardly through vents 146—148 for discharge through cap 158. When the juice or fluid has reached the under surface of disc 161 opening 162 is sealed and any remaining air is permitted to vent through 146 by opening 163, so that when the fluid has reached seal 137 the can is completely filled and there is a certain amount of juice in conduits 142—145 and 146—148. At this point push rod 32 having reached the high point of cam track 39 begins its downward travel, closing valve 130 and as it moves downwardly nozzle structure 166 and displacement disc 161 are gradually withdrawn, and at the same time the fluid content of conduits 142—145 and 146—148 flows into the can, the bores 142 and 146 being vented by the tubes 145 and 148, the amount of such juice equaling the displacement of said nozzle and disc structure, so that when the latter is entirely withdrawn the can is completely filled and is then delivered to the capper or can closing apparatus, as will be well understood.

It will be apparent that during the filling operation the non-oxydizing gas is delivered through pipe 85 to the stationary cap block 80 and to the rotating line 72 which rotates with main shaft 24 journaled in bearings 16 and 17, said gas passing through coupling plug 89, pipes 92 and 94 and discharging into channel 101, so that by means of such structural arrangement gas is enabled to be continuously delivered to said tank during its rotative travel, as well as when it is stationary.

From the above it is apparent that I have designed a method and apparatus for filling containers with a liquid such as fruit juice and the like, so designed that the liquid will be delivered to and through the apparatus and into the containers under oxygen excluding conditions, said apparatus including a tank, removable means for forming a restricted channel or passage within the tank, means for introducing an inert gas into said channel, means for introducing the liquid into said gas filled channel, and means including a plurality of filler assemblies for discharging the liquid into and at the bottom of the containers as each is operatively positioned, and means for treating with a jet of steam each can immediately preceding, respectively, its filling and sealing operations, said apparatus comprising few parts, simple in construction, manufacturable at a reasonable cost, and efficient for the purposes intended.

Although in practice I have found that the form of my invention illustrated in the accompanying drawings and referred to in the above description as the preferred embodiment is the most efficient and practical; yet realizing the conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. In a filling machine of the rotary type, a tank, removable means for forming an annular reservoir in said tank, a series of can filling valve assemblies, each assembly having a valve head seating in the bottom of said reservoir and a vent head slidably mounted in the top of said reservoir, said vent head terminating in a removable cap, a discharge nozzle structure connected with said valve head, including a liquid discharge tube and a filling head, an air inlet tube communicating with the valve head and removable cap, and an air vent tube communicating with said cap and extending through said filler head, means for air evacuating said reservoir and filling it with an inert gas, means for introducing a liquid into said reservoir, said valve assemblies operating successively to maintain a continuous flow of liquid through the reservoir from said nozzles under oxygen excluding conditions.

2. In a filling machine of the rotary type, a tank, a center well member insertable in the tank, adapted to form an annular channel in said tank, the bottom of said member being spaced above the bottom of the tank, means to remove the air from said channel, said well member having a centrally located standpipe communicating with the space below said member, means for introducing a liquid into said standpipe for distribution to said channel simultaneously throughout its length in the presence of an inert gas, and means for discharging the liquid contents of said channel under oxygen excluding conditions.

3. In a filling machine of the rotary type, a tank, a center well member insertable in the tank, adapted to form an annular channel in said tank, the bottom of said member being spaced above the bottom of the tank, means to remove the air from said channel, said well member having a centrally located standpipe communicating with the space below said member, means for introducing a liquid into said standpipe for distribution to said channel simultaneously throughout its length in the presence of an inert gas, means for discharging the liquid contents of said channel under oxygen excluding conditions, and means embodying a series of container filling valve assemblies for discharging the liquid contents of the channel under conditions precluding oxygen contact and establishing a substantially continuous flow of liquid through said channel.

4. In an apparatus for filling containers with liquid under non-oxidizing conditions, a tank, means removably fixed within the tank to provide an annular passageway therein, means to remove the air from said passageway, a conduit extending into the tank to introduce the liquid therein, a restricted channel between the conduit and the passageway to admit the liquid into the passageway, filler valves in communication with the passageway to admit the liquid into the containers being filled under non-oxidizing conditions, and means passing through the said passageway to discharge air from the containers being filled.

5. In an apparatus for filling containers with liquid under non-oxidizing conditions, a tank, means removably fixed within the tank to provide an annular passageway therein, means to remove the air from said passageway, means to maintain said passageway under a pressure of inert gas slightly in excess of atmospheric, a conduit extending into the tank to introduce the liquid therein, a restricted channel between the conduit and the passageway to admit the liquid into the passageway, filler valves in communication with the passageway adapted to discharge the liquid into the containers, and means passing through the passageway to discharge air from the containers being filled.

6. In an apparatus for filling liquids subject to oxidation into containers under non-oxidizing conditions, a tank, means removably secured within the tank to provide an annular passageway, means to remove the air from the passageway, a conduit in communication with the tank to introduce the liquid therein, a restricted channel between the conduit and the passageway to admit the liquid into the passageway, a plurality of filler valves in communication with the passageway to introduce the liquid into the containers under non-oxidizing conditions, each valve being slidably mounted in the upper and lower walls of the passageway and having at its upper end a cap and at its lower end a nozzle, the nozzle including a liquid discharge tube adapted to project within the container during the filling operation, and vent means associated with said cap and discharge tube to remove the air from the container.

7. In an apparatus for filling liquids subject to oxidation into containers under non-oxidizing conditions, a tank, a well member removably secured within the tank to provide an annular passageway therein, the bottom of said well member being spaced above the bottom of the tank to form a restricted channel, means to remove the air from the passageway, a conduit to introduce the liquid into the apparatus extending through the well and in communication with the restricted channel whereby the liquid will be distributed to the passageway, and means to discharge the liquid from the passageway into the containers under non-oxidizing conditions.

8. In an apparatus for filling liquids subject to oxidation into containers under non-oxidizing conditions, a tank, a well member removably secured within the tank to provide an annular passageway therein, the bottom of said well member being spaced above the bottom of the tank to form a restricted channel, means to remove the air from the passageway, a conduit to introduce the liquid into the apparatus extending through the well and in communication with the restricted channel whereby the liquid will be distributed to the passageway, and a series of filler valves in communication with the passageway to discharge the liquid into the containers under non-oxidizing conditions.

RONALD B. McKINNIS.